R. & A. McMAUGH.
BOAT DETACHING HOOK.
No. 175,130. Patented March 21, 1876.
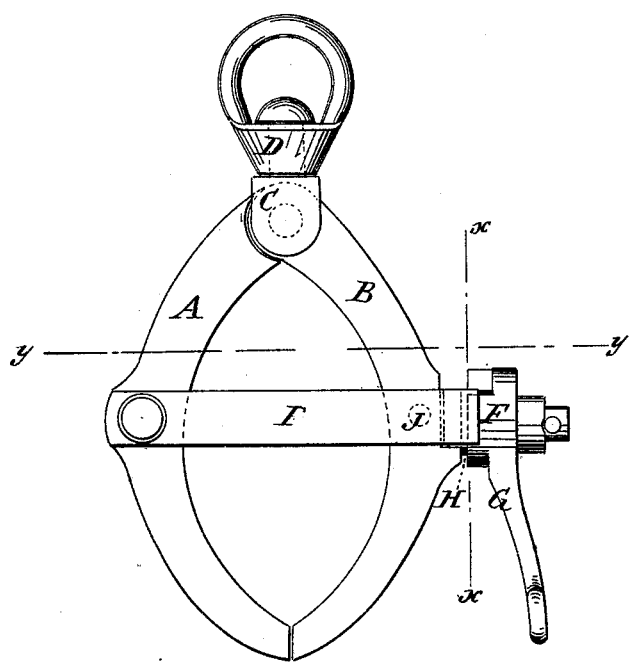
Fig: 1.
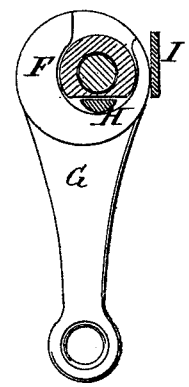
Fig: 3.
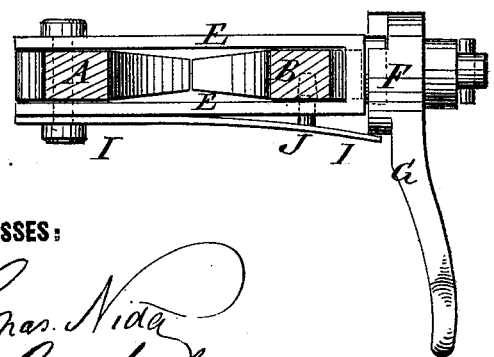
Fig: 2.
WITNESSES:
Chas. Nida
John Goethals
INVENTOR:
R. McMaugh
A. McMaugh
BY
ATTORNEYS

UNITED STATES PATENT OFFICE.

ROBERT McMAUGH AND ARCHIBALD McMAUGH, OF ST. CATHERINES, CANADA.

IMPROVEMENT IN BOAT-DETACHING HOOKS.

Specification forming part of Letters Patent No. 175,130, dated March 21, 1876; application filed February 28, 1876.

*To all whom it may concern:*

Be it known that we, ROBERT MCMAUGH and ARCHIBALD MCMAUGH, of St. Catherines, in the county of Lincoln, Province of Ontario, and Dominion of Canada, have invented a new and useful Improvement in Hooks for Boat-Tackle Falls, &c., of which the following is a specification:

Figure 1 is a side view of our improved device. Fig. 2 is a cross-section of the same, taken through the line $y\,y$, Fig. 1. Fig. 3 is a detail section, taken through the line $x\,x$, Fig. 1.

Similar letters of reference indicate corresponding parts.

The object of this invention is to furnish an improved hook for boat-tackle falls and other uses, which shall be so constructed that it may be tripped from the boat or from the vessel, as may be desired, which may be tripped with a loaded boat as readily as with an empty one, and which shall be simple in construction, and safe, reliable, and convenient in use.

The invention consists in the combination of the two hooks, abutting against each other at their points and hinged to the swivel, and the pivoted loop with each other, and in the combination of the cam, the lever, the spring, and its pin, with the pivoted loop, and the hinged hooks, as hereinafter fully described.

A and B are two hooks, the upper ends of which are hinged to the jaws of a bolt, C, to which is swiveled the ring D. The hooks A B are curved, and are so formed that their lower ends may abut against each other, as shown in Figs. 1 and 2. To the middle part of the hook A is pivoted the open end of a loop, E, which passes around the hook B, and rests upon a shoulder formed upon the outer edge of the middle part of the said hook B. Upon the closed end of the loop E is formed a pivot to receive the cam F, which is provided with a lever, G, by which it may be operated by hand, or by a cord attached to its end and extending to the deck of the vessel. The cam F is recessed to receive a projection, H, formed upon the hook B, and is notched upon the side opposite the lever G, so that when the said lever is turned upward it may raise the loop E and allow the hooks A B to be spread apart or opened by the weight of the boat. I is a spring, one end of which is secured by the bolt that pivots the said loop to the hook A, and its other end rests upon the cam F. To the spring I is attached a pin, J, which passes through a hole in the arm of the loop E, and enters a hole in the hook B to lock the loop E to said hook.

The cam F is so formed that when it is turned to bring its lever upward, it may force outward the spring I, withdrawing the pin J from the hook B, and allowing the loop E to be raised.

Having thus described our invention, we claim as new and desire to secure by Letters Patent—

1. The combination of the two hooks A B, abutting against each other at their points and hinged to the swivel C D, and the pivoted loop E with each other, substantially as herein shown and described.

2. The combination of the cam F, the lever G, the spring I, and its pin J, with the pivoted loop E and the hinged hooks A B, substantially as herein shown and described.

ROBERT McMAUGH.
ARCHIBALD McMAUGH.

Witnesses:
W. J. McMAUGH,
JOHN E. BELL.